Patented Nov. 7, 1939

2,178,787

UNITED STATES PATENT OFFICE 2,178,787

PROCESS FOR PREPARING FISH AND PRODUCT THEREOF

Thomas Slade Gorton, Jr., Evanston, Ill.

No Drawing. Application January 12, 1939, Serial No. 250,574

4 Claims. (Cl. 17—45)

This invention relates to a fish product and process of preparing the same for the market, and has for its object a method of preparation which will reduce marketing costs and also present a more attractive product for the consumer.

The process is more particularly applicable to relatively small fish such as whiting. The bony structure of this fish is principally confined to the back bone and fins whereby after being deheaded, skinned, cleaned and cooked it may be eaten from the back bone in much the same manner as corn on the cob or a chicken leg.

Heretofore in preparing such fish for market much of the edible portion thereof has been thrown away by a wasteful skinning and cleaning operation. Furthermore this waste usually occurs at or near the point of consumption after all the charges of freezing, storage and shipping have accrued on the waste. The monetary loss on this waste may be considerable, since whiting is taken off the Atlantic seaboard and is largely consumed in the middle west. Furthermore it is a seasonable fish, being caught in usual years in quantity only between May and November, whereby the entire year's supply must be frozen at this time. Some of the catch is necessarily held in cold storage nine or ten months and even longer in order to supply the trade throughout the year. An extra heavy consumption of course occurs during Lent which comes about eight months after the center of the heavy producing season. Inasmuch as whiting is a cheap fish at point of production, the freezing, storage, and transportation charges are a large part of the cost on the finished product so that any saving made on these charges is of substantial importance.

It is not practical commercially to thoroughly clean and skin these fish immediately after being caught if they are to be stored in freezers for later consumption. One reason for this is that whiting is satisfactorily skinned only after being frozen and then slightly defrosted or thawed out at the surface. This condition enables the skin to be peeled off easily while leaving the flesh surface smooth and unbroken. Skinning of unfrozen fish tears the flesh and does not present the attractive appearance demanded by the trade. On the other hand, if whiting is frozen, then defrosted for skinning and again refrozen for storage, the flesh loses its fresh white color. It discolors and becomes unmarketable. Consequently whiting should be stored in the freezer in unskinned condition and the skinning thereof should take place only just prior to marketing of the fish.

According to the practice heretofore employed in preparing whiting for the market the fish immediately upon being brought ashore are merely "deheaded" and "gutted" without thorough cleaning, and are frozen for storage in freezers at the fish port or are shipped frozen for storage in freezers at distant points. In any even the fish are not skinned or thoroughly cleaned for such cold storage. The partial cleaning operation preparatory to cold storage consists in chopping off the heads with a stroke of a knife and then giving the fish a brisk shake by the tail to cast out most of the entrails through the deheaded opening. No attempt is made to wash out or thoroughly clean out the entrails as this is considered a waste of time inasmuch as the fish under this former practice are to be thoroughly and finally cleaned when later removed from the freezer for skinning. For placing in the freezer the deheaded and gutted fish are laid and packed in pans, each pan customarily holding thirty to thirty-five pounds of fish. Deheaded and gutted whiting will run from two to five fish per pound, and a packed pan will contain two or three layers deep of closely packed fish. The belly pouches of the fish in this condition are of course deflated and when thus packed together in the pan will freeze hard into various distorted, folded, and irregular shapes, anything but round, as would be the case of a full bellied fish. The consequence of this is that when the frozen fish are to be given a final skinning and cleaning, this operation requires much more time and labor and causes more waste of edible portions of the fish than if the fish had been frozen in their natural round full bellied shape.

The customary operation of skinning and cleaning at this stage is performed by hand and consists as above stated, in first defrosting slightly the surface of the fish, just enough so that the skin can be peeled off. The fish is grasped in the left hand near the tail and held in semi-vertical position with the butt end or neck resting on the skinning bench. The fish is rigid because still frozen. With a sharp knife the skinner cuts a narrow and shallow strip down the back ridge of the fish, cutting off the rows of fins that run the entire length of the back from tail to neck. The skinner then turns over the fish so that the undertail fin faces the knife and then cuts down beneath the undertail fin and along the belly of the fish to the butt end or neck. The cut across the belly portion is made wider and deeper than the previous cut, so as to take out a wide strip and a considerable part of this belly portion of the fish with the cut. The reason for this is that the deflated belly portion is misshapen and distorted and almost impossible to skin properly, and therefore has to be cut out and thrown away. The above operation of two cuts, one along the back ridge and one along the front leaves the skin on the fish divided in two parts. The skinner then turns the fish in his hand so that the butt or neck end faces the knife. Now he cuts a notch in the butt end of the fish and catches the skin between his thumb and the knife blade and then pulls the skin off that side of the fish with a quick pull. Usually however, because of the misshapen form of the fish the skin will not come off cleanly but will break and the skinner will have to cut another notch and start again. Often times it is necessary for the skinner to make five or six cuts in order to remove the skin on one side of the fish because of its misshapen condition. The further operation of cleaning requires that the belly pouch be thoroughly scraped clean of all remanents of entrails and usually in this operation further portions of the belly are cut off and thrown away. In the usual case it will require from the skinner ten to fifteen cuts and scrapes with a sharp knife to skin, cut away, and thoroughly clean the belly of a whiting at this stage.

The foregoing operations of final cleaning and skinning are wasteful of time, labor, and edible portions of the fish, all of which add to the cost expense per pound of the fish as marketed.

By my method of market preparation, the larger part of this loss will be avoided, considerable labor will be saved in the final skinning operation and in addition a more attractive and palatable fish product will be presented to the consumer.

My process consists of the following steps. The fresh fish, shortly after being taken from the ocean, is deheaded in the usual manner by a cross cut back of the gills which opens up the forward end of the belly pouch of the fish. This belly pouch is preferably left intact, or at least there is left a sufficient portion of the belly to provide a concave pouch for the particular purpose hereinafter mentioned. The entrails are removed through said forward opening and the inside of the belly pouch is thoroughly cleaned and washed. Any of the well known automatic washing or rinsing devices may be employed as are in common use for washing out the inside of glasses at soda water fountains and bars. The cleaned fish when has its empty belly pouch stuffed with an edible material such as spiced oyster dressing or any other desirable stuffing that will stand subsequent freezing and be preserved thereby.

After cleaning and stuffing the fish as aforesaid they are packed and placed in the freezer for hard freezing. Due to the fact that the belly pouches of the fish have been stuffed full, the fish will keep a well rounded shape during packing and freezing. This natural round shape of the fish greatly facilitates the subsequent skinning operation and saves considerable labor and waste therein.

After being frozen hard as aforesaid the stuffed fish are ready for the next operation of skinning. This may be done immediately or the stuffed fish may be stored indefinitely in the freezer as is the case of any frozen fish until shipped or finally marketed. In any event the final skinning of the fish should not take place until just prior to the time the fish are to be marketed to the consumer since as before stated the fish preserve better with the skins on.

When desired for the final skinning operation the fish are removed from the freezer and very slightly defrosted at the surface. This partial thawing should only be sufficient to enable the skin to be easily peeled off without tearing the flesh. The frozen fish may have their surface defrosted suitable for skinning by dipping the same in hot water, or by passing the same briefly over a gas flame or merely by letting the fish stand in a room of normal temperature for a sufficient length of time. This last method requires timing control so as not to allow the fish to thaw out too much.

The final operation of skinning the fish should be accomplished with as little cutting of the flesh as possible. In the manner previously described a narrow shallow shaving cut is made along under the fins of the back and a similar cut under the fins of the front so as to divide the skin in two half portions which will then very easily peel off. Inasmuch as the frozen and stuffed fish is in full rounded shape during this skinning operation it will usually take only two stripping off movements, one for the skin on each side of the fish. The saving of labor and time over that required in the previous practice is manifest. A further elimination of waste under my method will be due to the noncutting away of the belly portion of the fish as in the prior practice.

By my method of market preparation a larger percentage of the fish caught will be used for human food—a larger percentage of the semirough product will become finished product—and much of the before mentioned waste in freezing, storage, and transportation charges will be eliminated. Considerable labor will be saved in the final skinning operation, and in addition a more attractive and palatable fish product will be presented to the consumer.

I have estimated that in my improved process, using as a basis for calculation whiting taken from the Atlantic Ocean and marketed at St. Louis, Missouri, with an average of eight months' cold storage, a saving of 25% in the cost of the product as sold is effected. The factors taken into consideration for this estimate are savings in freezing, transportation, storage on waste portions of the fish and the reduced labor cost in the final skinning operation.

I claim:

1. Process of preparing fish for market which consists in deheading and gutting the fish, thoroughly cleaning the entrails from the belly pouch of said fish, stuffing said belly pouch with edible material adapted for preservation by freezing, freezing said stuffed carcass, and after said carcass is frozen then slightly defrosting the surface of the same but only to the point where the skin will peel off without tearing the flesh, and finally removing the skin while the carcass is still frozen rigid and before it is further thawed out.

2. Process of preparing fish for market which consists in deheading and gutting the fish, thoroughly cleaning the entrails from the fish in a manner to leave intact a concave belly pouch portion, stuffing said belly pouch with edible material adapted for preservation by freezing, freezing said stuffed carcass, and after said carcass is frozen then slightly defrosting the surface of the same but only to the point where the skin will peel off without tearing the flesh and finally removing the skin while the carcass is still frozen rigid and before it is further thawed out.

3. Process of preparing fish for market which consists in deheading the fish by a transverse cut so as to leave the belly pouch with belly intact and with an opening only at the neck portion of the fish, removing the entrails and thoroughly cleaning the belly pouch through said neck opening, stuffing said belly pouch with edible material adapted for preservation by freezing, freezing said stuffed carcass, and after said carcass is frozen then slightly defrosting the surface of the same but only to the point where the skin will peel off without tearing the flesh, and finally removing the skin while the carcass is still frozen rigid and before it is further thawed out.

4. Process of preparing fish for market which consists in deheading and gutting the fish, thoroughly cleaning the entrails from the belly pouch of said fish, stuffing said belly pouch with edible material adapted for preservation by freezing, freezing said stuffed carcass, and after said carcass is frozen then slightly defrosting the surface of the same but only to the point where the skin will peel off without tearing the flesh, finally removing the skin while the carcass is still frozen rigid and before it is further thawed out, said removal of the skin being accomplished by a shallow knife cut beneath the fins along the back ridge and front ridge of the carcass, and finally peeling off the remaining skin portions.

THOMAS SLADE GORTON, Jr.